(12) United States Patent
Harari (10) Patent No.: US 12,460,740 B2
(45) Date of Patent: Nov. 4, 2025

(54) BLOCKING VALVE (71) Applicant: Michael Harari, Panama (PA)

(72) Inventor: Michael Harari, Panama (PA)

( * ) Notice: Subject to any disclaimer, the term of this patent is extended or adjusted under 35 U.S.C. 154(b) by 0 days.

(21) Appl. No.: 18/056,263

(22) Filed: Nov. 17, 2022

(65) Prior Publication Data

US 2024/0167575 A1    May 23, 2024

(51) Int. Cl.
*F16K 35/02* (2006.01)
*F16K 15/03* (2006.01)

(52) U.S. Cl.
CPC .......... *F16K 35/025* (2013.01); *F16K 15/034* (2021.08); *Y10T 137/7256* (2015.04); *Y10T 137/7903* (2015.04)

(58) Field of Classification Search
CPC ........ F16K 15/034; F16K 35/00; F16K 35/02; F16K 35/022; F16K 35/025; F16K 35/04; F16K 35/06; F16K 35/10; F16K 15/023; F16K 17/12; F16K 17/24; F16K 1/2285; F16K 17/194; Y10T 137/7256; Y10T 137/7903
USPC ................ 70/175–180; 137/385, 527, 527.8; 251/89, 101–116, 72
See application file for complete search history.

(56) References Cited

U.S. PATENT DOCUMENTS

| | | | | |
|---|---|---|---|---|
| 121,960 A * | 12/1871 | Peters | .................... | F16K 11/052 193/31 R |
| 1,287,534 A * | 12/1918 | Watts | .................... | F16K 27/045 137/523 |
| 1,329,943 A * | 2/1920 | Weller | .................... | B60R 25/042 70/242 |
| 1,399,004 A * | 12/1921 | Case | ........................ | F02M 1/00 73/861.75 |
| 1,740,041 A * | 12/1929 | Schmidt | .................... | F16K 1/228 251/188 |
| 1,897,678 A * | 2/1933 | Schiorring | ............ | F16K 17/386 251/72 |
| 3,741,519 A * | 6/1973 | Moyer | .................... | F16K 35/06 251/111 |
| 3,827,671 A * | 8/1974 | Bolden | ................. | F16K 5/0605 251/297 |

(Continued)

FOREIGN PATENT DOCUMENTS

CN             1385594 A      12/2002
WO    WO-2019199188 A2 * 10/2019  ........... F16K 15/023

OTHER PUBLICATIONS

European Search Report for corresponding European application 23208695.9 mailed on Mar. 26, 2024.

*Primary Examiner* — Kenneth Rinehart
*Assistant Examiner* — Jonathan J Waddy
(74) *Attorney, Agent, or Firm* — Heidi Brun Associates Ltd.; Heidi M. Brun (57) ABSTRACT

A blocking valve has an outer valve body housing a weighted paddle, the weighted paddle having a narrow upper portion with a hitch groove and a wider lower portion, the weighted paddle rotatable around a horizontal pivot, the weighted paddle to lie in a horizontal position during an active flow of liquid and to rotate to a vertical position with the upper portion above the lower portion when the flow of liquid is stopped, and a locking mechanism to engage with the hitch groove to lock the weighted paddle into a vertical position and to block the active flow of liquid when the active flow of liquid is resumed.

3 Claims, 7 Drawing Sheets

Water Outlet                                    Water Inlet

(56) References Cited

U.S. PATENT DOCUMENTS

| | | | | |
|---|---|---|---|---|
| 3,939,864 | A | * | 2/1976 | Donnelly ................ F16K 1/221 |
| | | | | 137/385 |
| 4,235,258 | A | * | 11/1980 | Uno .................... F16K 37/0008 |
| | | | | 251/297 |
| 4,253,690 | A | * | 3/1981 | Hollander ................ G05G 5/28 |
| | | | | 292/354 |
| 4,348,006 | A | * | 9/1982 | Schmitt .............. F16K 27/0218 |
| | | | | 251/366 |
| 4,662,394 | A | * | 5/1987 | Williams ................. F16K 5/10 |
| | | | | 137/630.21 |
| 4,672,203 | A | * | 6/1987 | Holkeboer ........... F16K 39/024 |
| | | | | 250/281 |
| 4,770,392 | A | * | 9/1988 | Schmidt .................. F16K 1/221 |
| | | | | 251/303 |
| 5,265,846 | A | * | 11/1993 | Shreve ...................... F16K 1/22 |
| | | | | 251/188 |
| 7,597,150 | B2 | | 10/2009 | Clem |
| 7,789,152 | B2 | | 9/2010 | Langeslag |
| 8,091,793 | B2 | | 1/2012 | Kempf |
| 8,312,931 | B2 | | 11/2012 | Xu et al. |
| 9,109,712 | B2 | | 8/2015 | Fletcher et al. |
| 10,370,834 | B2 | | 8/2019 | Ball |
| 2001/0035008 | A1 | | 11/2001 | Nozawa |
| 2009/0116938 | A1 | * | 5/2009 | Wakabayashi .......... F16K 35/00 |
| | | | | 414/217.1 |
| 2012/0060940 | A1 | * | 3/2012 | Francis ............... F16L 55/1018 |
| | | | | 137/561 R |

\* cited by examiner

BLOCKING VALVE

FIELD OF THE INVENTION

The present invention relates to valves generally and to shut-off water valves in particular.

BACKGROUND OF THE INVENTION

Traditional blocking valves exist in the art with ability to control the flow of fluids such as water. These are predominantly manually controlled such as a regular household tap or faucet.

There are many diverse types of fluid blocking valves in the art. For example, Chinese Patent No. 1,385,594A discloses a down-hole intelligent water-plugging valve designed for plugging the water exit of an air reservoir.

U.S. Pat. No. 7,597,150B2 discloses an apparatus for controlling fluid flow between a wellbore tubular and a wellbore annulus including a passage between a bore of the wellbore tubular and the wellbore annulus. The passage causes cavitation in a flowing fluid made up of mostly water. The cavitations activate a flow control device that controls fluid flow into the wellbore tubular.

U.S. Pat. No. 7,789,152 discusses a downhole plug protection system and U.S. Pat. No. 8,312,931 discloses an inflow control device whose elements may change the inertial direction of the fluid flowing in the flow path.

US Patent Publication No. 2001/035008A3 discloses a releasable connection with simple means for ensuring its stability.

U.S. Pat. No. 1,037,0834B2 discloses a double check valve that includes an in-line inlet check valve and an outlet check valve that cooperate to prevent back flow of fluid through the valve.

U.S. Pat. No. 8,091,793 discloses a faucet has a fixture body in fluid communication with a pressurized supply of hot water.

SUMMARY OF THE PRESENT INVENTION

There is provided, in accordance with a preferred embodiment of the present invention, a blocking valve. The blocking valve includes an outer valve body housing a weighted paddle, the weighted paddle having a narrow upper portion with a hitch groove and a wider lower portion, the weighted paddle rotatable around a horizontal pivot, the weighted paddle to lie in a horizontal position during an active flow of liquid and to rotate to a vertical position with the upper portion above the lower portion when said active flow of liquid is stopped; and a locking mechanism to engage with the hitch groove to lock said weighted paddle into a vertical position and to block the active flow of liquid when the active flow of liquid is resumed.

Moreover, in accordance with a preferred embodiment of the present invention, the outer valve body is connectable to a horizontal fluid passageway.

Further, in accordance with a preferred embodiment of the present invention, the outer valve body is integrated with a horizontal fluid passageway.

Still further, in accordance with a preferred embodiment of the present invention, the lower portion is heavier than said upper portion causing a counterweight.

Additionally in accordance with a preferred embodiment of the present invention, the locking mechanism includes a hitch element to engage with the hitch groove to prevent the weighted paddle from rotating, a spring to raise the hitch element and a pin to pull on said spring in order to disengage said hitch element from said hitch groove.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that the methods and devices of the traditional blocking valves of the prior art are unable to sufficiently avoid fluid loss within a hydraulic and/or fluid conduction system when the flow of the fluid is unexpectedly cut and then periodically restored. In this scenario, the valve or faucet may remain open once the water supply has been cut and vast amounts of water may be lost when the supply returns and there is no one around (such as in the middle of the night) to manually turn the supply off. This may cause substantial damage caused by flooding and have financial consequences for both homes and businesses.

This situation is particularly prevalent in countries which are known to have cuts in water supply. The cut may come at any time without warning and may last for several hours.

Applicant has further realized that the prior art techniques and devices described herein above do not effectively provide solutions to this problem. The prior art solutions often consist of insubstantial and vulnerable materials and methods of use that are susceptible to mechanical and physical failures to limiting device capabilities and capacities.

Applicant has realized that the above-mentioned problem of on/off water supply may be efficiently and cheaply resolved using a blocking valve configured in (i.e., integrated with or attachable to) a horizontal fluid passageway such as the main waterpipe of a building. The valve may consist of a valve body having an inlet and an outlet placed in diametrically opposite positions for the flow of water. A weighted rotatable paddle with a horizontal pivot within the valve body may remain in a horizontal position while fluid is flowing though the valve but may rotate 90 degrees when the flow is stopped and held in position to stem any further flow through the outlet. The upper part of the paddle may actuate a locking mechanism which may hold the paddle in place, thus blocking the flow of water until it is manually released.

Applicant has also realized that such a blocking valve may have a structure that is relatively inexpensive to produce and therefore the cost factor and the ability to attach it to any horizontal piping may allow for easy use by the general public; i.e., it may be attached to private homes as well as commercial structures.

Figure 1:
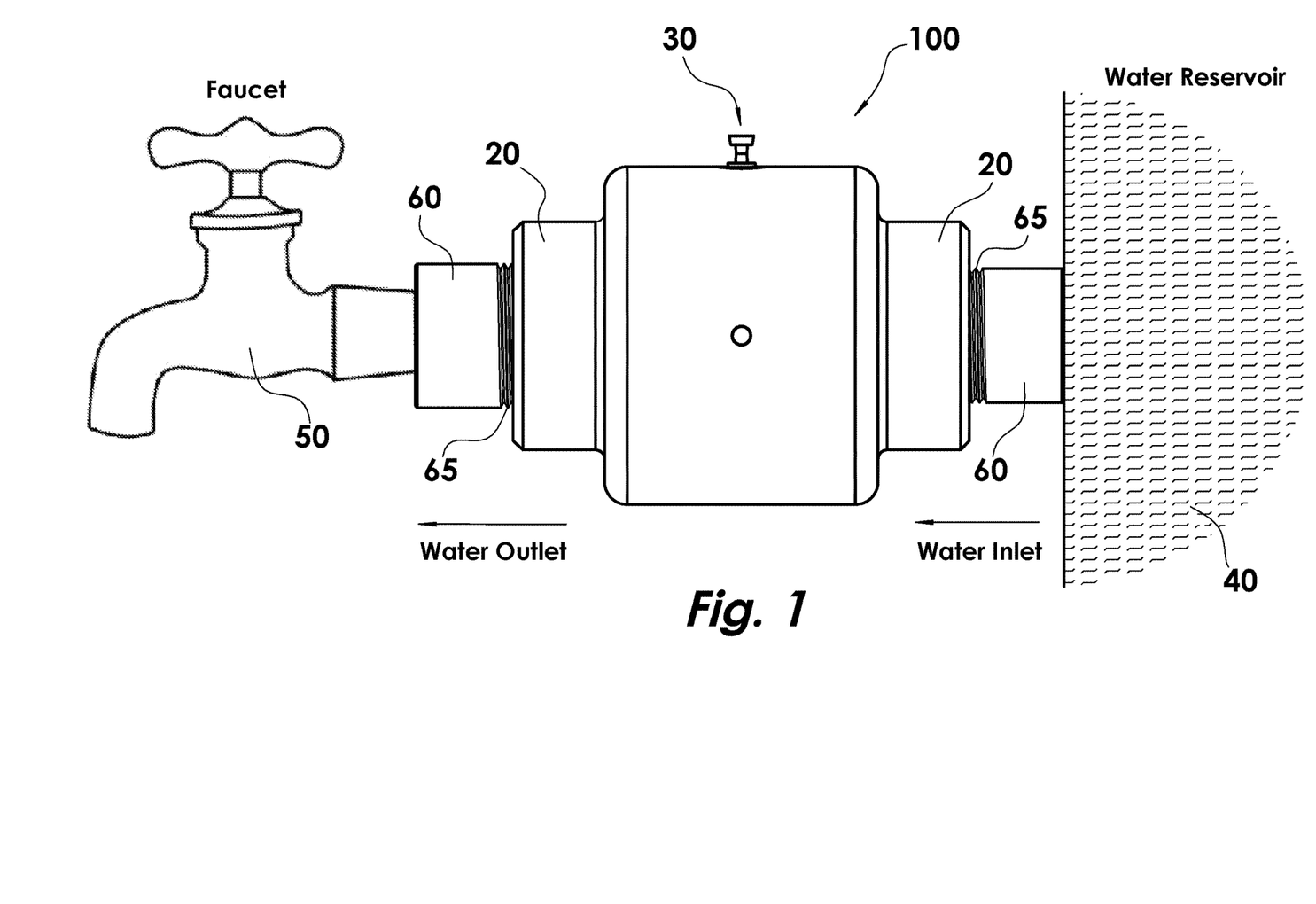
FIG. 1 is a schematic illustration of a blocking valve connected to a horizontal fluid passageway, in accordance with a preferred embodiment of the present invention.

Reference is made to FIG. 1 which illustrates a blocking valve 100 according to an embodiment of the present invention. Blocking valve 100 may comprise an outer valve body 20 and a locking mechanism 30. Blocking valve 100 may be attachable to any horizontal piping 60 via threads 65. As is illustrated, blocking valve 100 may be attached to a fluid flow pipe such as piping which delivers water (as an example) from a reservoir 40 to a household faucet 50. In an alternative embodiment, blocking valve 100 may be an integral part of piping 60, i.e., a permanent attachment.

It will be appreciated that valve 100 may be manufactured from various metals and compositions, including various metals and/or metal alloys, various plastics and/or plastic compositions. It may further be manufactured from other various organic/inorganic compounds and materials.

Figure 2:
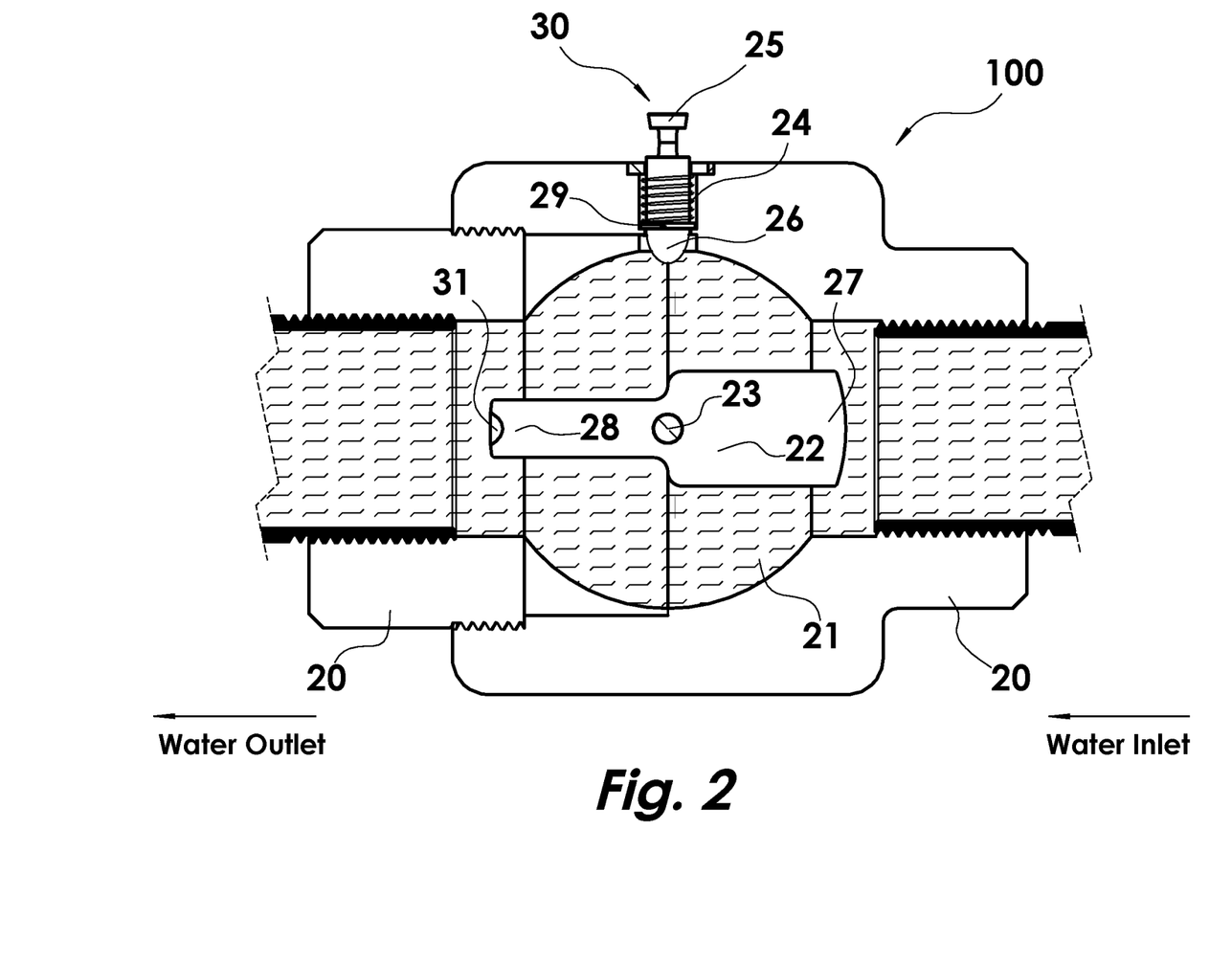
FIG. 2 is a schematic illustration of the blocking valve of FIG. 1 in an open position with fluid flowing through it, in accordance with a preferred embodiment of the present invention.

Reference is now made to FIG. 2 which illustrates the elements of outer valve body 20 and locking mechanism 30. FIG. 2 represents blocking valve 100 in a regular open position with fluid flowing through it. Valve body 20 may comprise a valve cavity 21 which in turn comprises a paddle 22 rotatable over horizontal pivot 23. Paddle 22 may consist of a lower portion 27 and an upper portion 28. Valve cavity 21 may have a spherical shape with the water inlet and outlet placed in diametrically opposite positions. Lower portion 27 may be wider than upper portion 28 and therefore be heavier and form a counterweight working with gravity. Paddle 22 may further comprise a hitch groove 31 integrated with upper portion 28.

Locking mechanism 30 may further comprise a spring 24, a pin 25 and a hitch element 26. Pin 25 may connect to spring 24 via a flange 29. It will be appreciated that hitch groove 31 may engage and lock hitch element 26 into a fixed position when paddle 22 is in an upright vertical position as described in more detail herein below.

It will be appreciated that when blocking valve 100 is in a normally open position, and locking mechanism 30 is in a released mode (as described in more detail herein below) and when the fluid supply is on, the pressure of the flow of fluid may be greater than the counterweight of lower portion 27, causing paddle 22 to rotate horizontally around horizontal pivot 23 to allow for the fluid to flow over in from the water inlet to the water outlet as is illustrated in FIG. 2.

Figure 3:
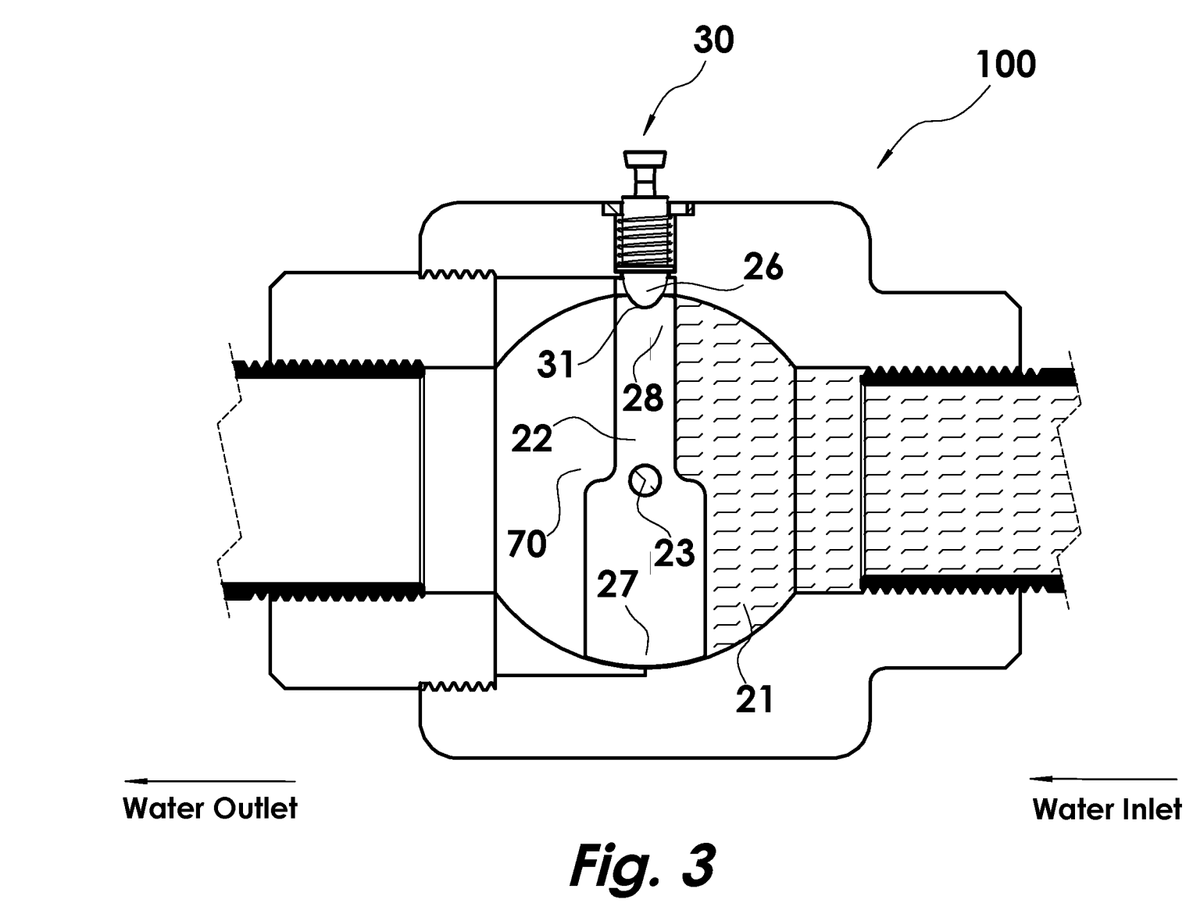
FIG. 3 is a schematic illustration of the blocking valve of FIG. 1 when the flow of fluid through it is stopped, in accordance with a preferred embodiment of the present invention.

Reference is now made to FIG. 3 which illustrates the scenario of when the fluid flow is stopped. When no fluid is flowing, the release in pressure of the flowing fluid may cause lower portion 27 to rotate around horizontal pivot 23 so that paddle 22 is now in a vertical position with heavier lower portion 27 at the bottom of valve cavity 21 and upper portion 28 with hitch groove 31 at the top engaged with hitch element 26 in a locked position. It will be appreciated that valve cavity 21 may be designed so that when paddle 22 is in its vertical position and held in place by locking mechanism 30, it may form a barrier 70 so that fluid cannot flow through valve 100 once the supply has been resumed, hence blocking the fluid flow.

Figure 4A:
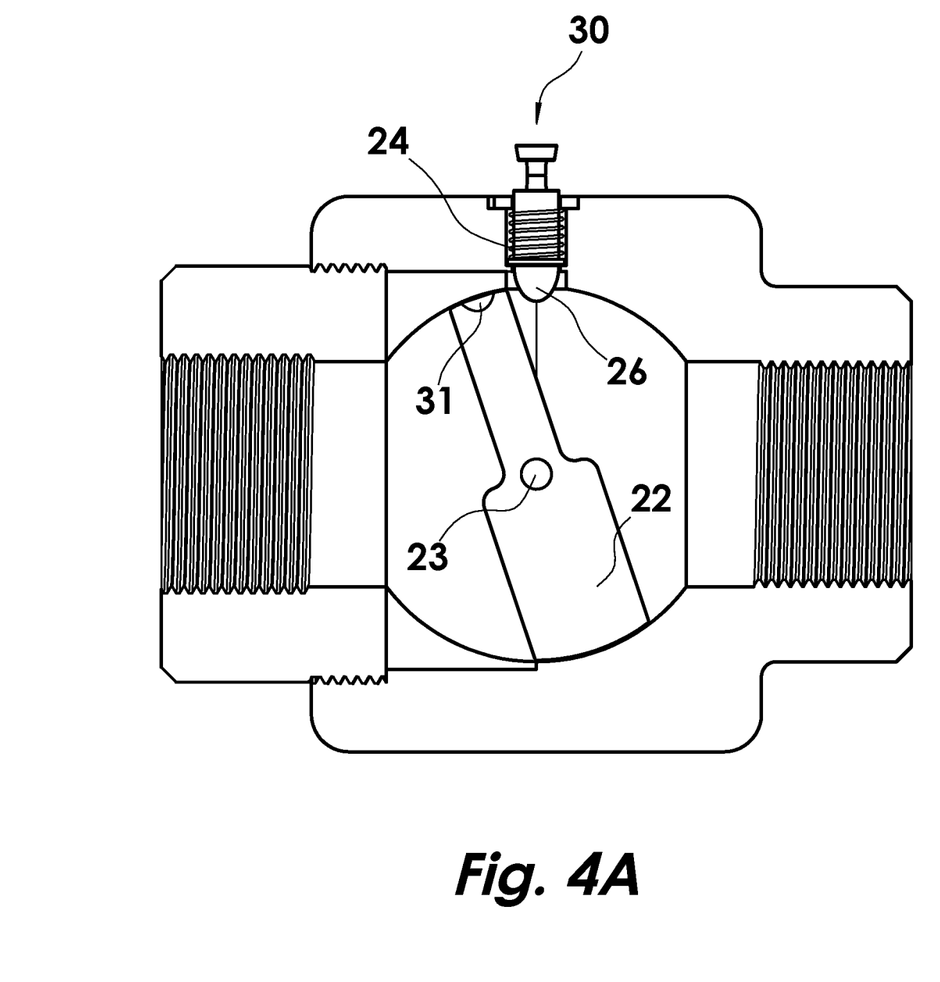
FIGS. 4A, 4B and 4C are schematic illustrations of the different stages of the locking mechanism of the blocking valve of FIG. 1, in accordance with a preferred embodiment of the present invention.
Figure 4B:
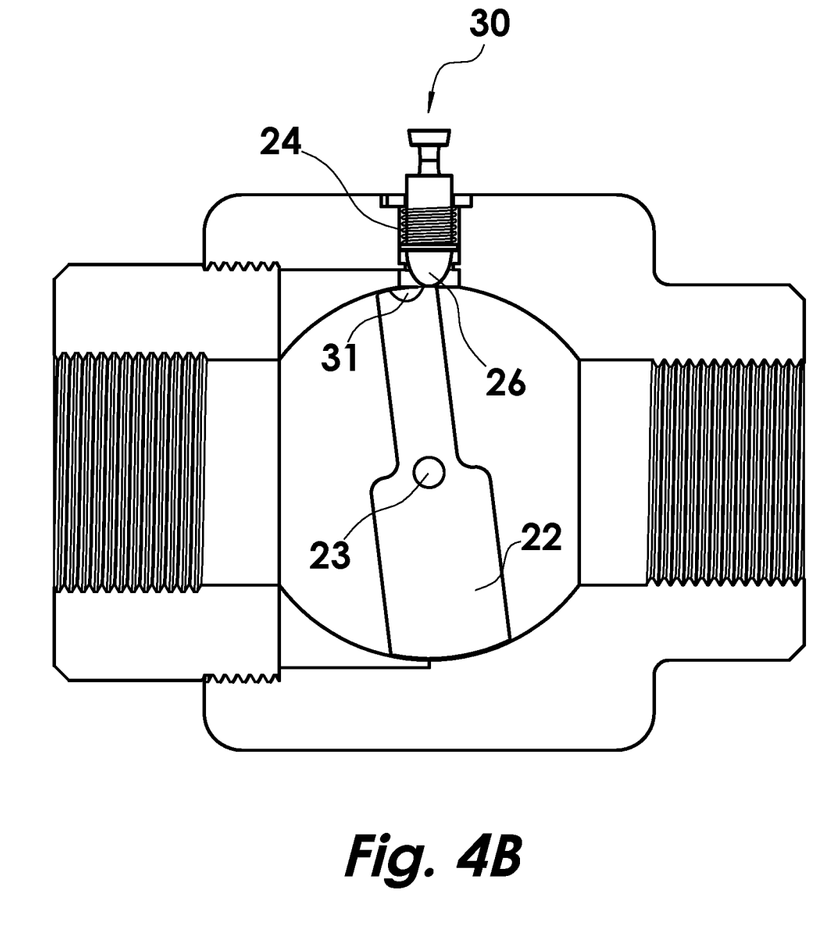
Figure 4C:
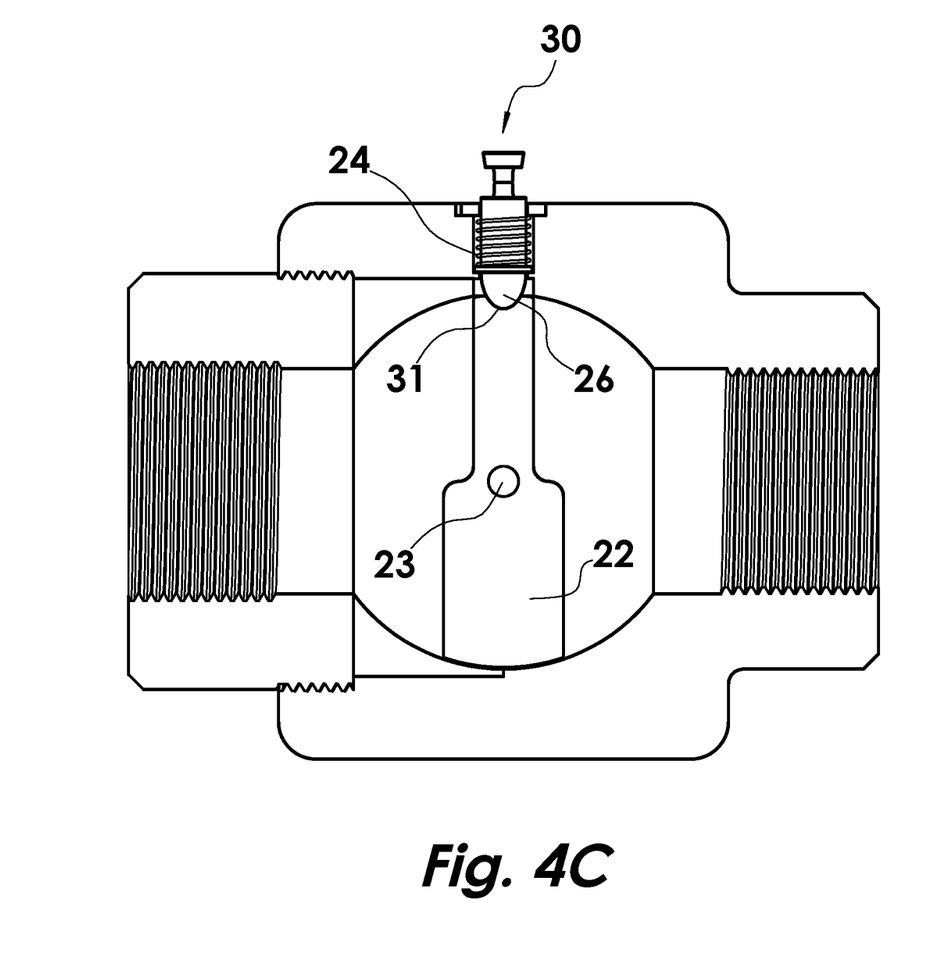

Reference is now made to FIGS. 4A, 4B and 4C which illustrate the different stages of how locking mechanism 30 locks when the flow of fluid stops. FIGS. 4A and 4B show how the rotation of paddle 22 around horizontal pivot 23 pushes against hitch element 26 which in turn causes spring 24 to contract, thus raising hitch element 26. Therefore, when paddle 22 is in its vertical position with hitch groove 31 at the top as shown in FIG. 4C, the pressure against hitch element 26 is lessened and spring 24 may release it so that hitch element 26 sits snugly within hitch groove 31 and paddle 22 is therefore locked in position.

Figure 5:
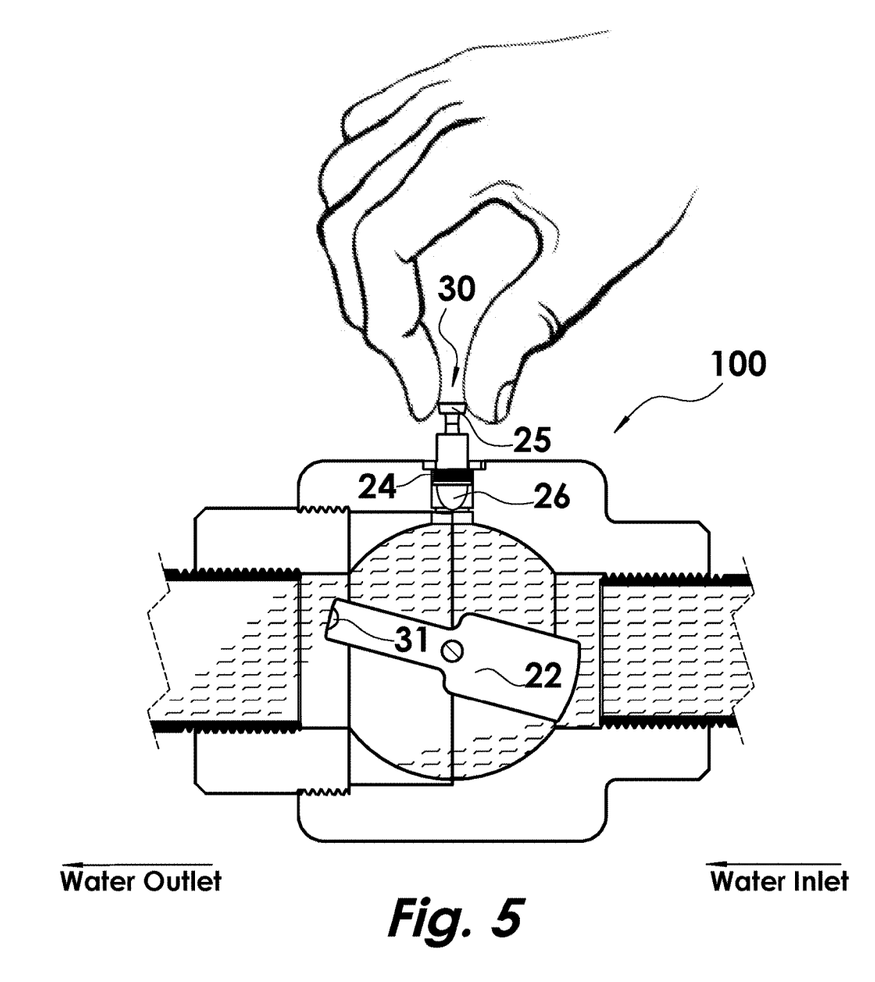
FIG. 5 is a schematic illustration of how the locking mechanism of FIG. 4C is manually released, in accordance with a preferred embodiment of the present invention.

Reference is now made to FIG. 5 which illustrates how locking mechanism 30 may be manually released so that paddle 22 may revert back to its horizontal position and allow fluid to flow through blocking valve 100. Pin 25 may be pulled upwards which in turn may pull on spring 24 making hitch element 26 rise upwards thus causing it to disengage from hitch groove 31 and releasing paddle 22 from its locked position.

It will be appreciated that once pin 25 has been released, spring 24 may contract back to its normal position ensuring that the elements of locking mechanism 30 also return to their normal positions for continuous use.

Thus, a relatively simple blocking valve may be attached to any horizontal fluid carrying pipe, which may automatically close when the flow of fluid is stopped and remain in a closed position until it is manually released.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A blocking valve, said blocking valve comprising:
an outer valve body having threads connectable to a horizontal fluid passageway and defining a valve cavity housing a weighted paddle, said weighted paddle having a narrow upper portion with a hitch groove and a wider lower portion, said weighted paddle rotatable around a horizontal pivot, said weighted paddle to lie in a horizontal position during an active flow of liquid and to rotate to a vertical position with said upper portion above said lower portion when said active flow of liquid is stopped, said outer valve body having a bore at a vertical location thereof; and
a locking mechanism in said bore to engage with said hitch groove to lock said weighted paddle into said vertical position and to block said active flow of liquid when said active flow of liquid is resumed,
wherein said locking mechanism comprises:
a hitch element in said bore and extending into said valve cavity during the active flow of liquid;
a spring in said bore arranged to:
bias said hitch element into the valve cavity, allow said hitch element to be raised against gravity when pressed by said weighted paddle as said weighted paddle rotates to said vertical position; and engage said hitch element with said hitch groove when said weighted paddle reaches said vertical position to prevent said weighted paddle from further rotation; and a pin partially in said bore to pull on said hitch element in order to disengage said hitch element from said hitch groove.

2. The blocking valve of claim 1 wherein said outer valve body is integrated with said horizontal fluid passageway.

3. The blocking valve of claim 1 wherein said lower portion is heavier than said upper portion causing a counterweight.

\* \* \* \* \*